UNITED STATES PATENT OFFICE.

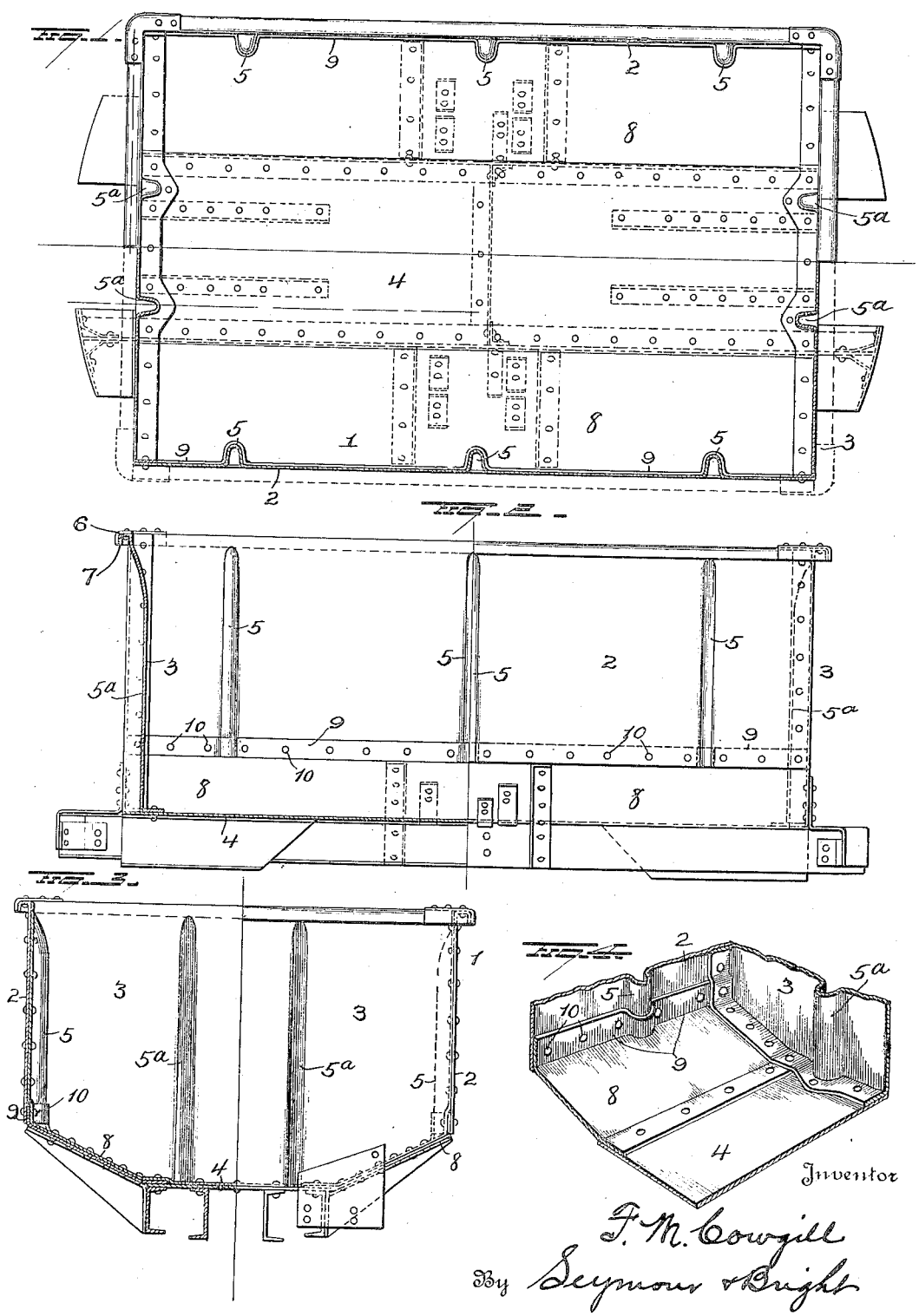

FRANK M. COWGILL, OF COLUMBUS, OHIO, ASSIGNOR TO THE RALSTON STEEL CAR COMPANY, OF COLUMBUS, OHIO.

CAR-BODY.

1,397,081.            Specification of Letters Patent.        Patented Nov. 15, 1921.

Application filed May 24, 1920. Serial No. 383,904.

*To all whom it may concern:*

Be it known that I, FRANK M. COWGILL, a citizen of the United States, and a resident of Columbus, in the county of Franklin and State of Ohio, have invented certain new and useful Improvements in Car-Bodies; and I do hereby declare the following to be a full, clear, and exact description of the invention, such as will enable others skilled in the art to which it appertains to make and use the same.

This invention relates to improvements in car bodies and more particularly to such as are adapted for mine cars,—one object of the invention being to provide a car body wherein the sheet metal sides or both sides and ends shall be provided with reinforcement in the form of stakes which shall not project outwardly beyond the planes of said sides or ends.

A further object is to so construct a sheet metal car body that the sides, or both sides and ends, shall be provided with integral inwardly projecting reinforcements and so that the upper edges of said sides or both sides and ends shall be provided with outwardly projecting reinforcing means.

A further object is to provide simple and efficient means whereby the side or outer edge portions of the floor plates shall be secured to and made to conform with the interior contour of the sides of the car body at the lower portions thereof.

With these and other objects in view, the invention consists in certain novel features of construction and combinations of parts as hereinafter set forth and pointed out in the claims.

In the accompanying drawings, Figure 1 is a plan view of a car body showing an embodiment of my invention; Fig. 2 is a side elevation partly in section; Fig. 3 is an end view partly in section, and Fig. 4 is an enlarged detail sectional view illustrating the connection between a floor plate and car side.

1 represents a sheet metal car body comprising sides 2, ends 3 and a bottom 4. Each sheet metal side 2 is provided with vertical inwardly projecting reinforcing members 5 which, as illustrated in the drawing, may be made as stakes integral with the side plates by forming inwardly projecting corrugations on the side plates. The car ends 3 also may be reinforced in the same manner as indicated at 5ª. The interior reinforcing corrugations extend from the lower edges of the car sides and ends approximately to the upper edges thereof, and the upper edge portions of the sheets forming the car sides and ends are bent outwardly as at 6 and then downwardly as at 7, whereby the upper edge portions of the car sides and ends are reinforced.

Floor plates 8 are provided and their side edges are formed with bent-up flanges 9 which overlie the inner faces of the lower portions of the car sides and are riveted to the latter as shown at 10,—said flanges being also bent or corrugated at intervals to conform to and embrace the inwardly projecting reinforcing portions or corrugations 5 of said sides.

By my improvements, reinforcing means or stakes on the outside of the sides and ends of the sheet metal car body is obviated and a car body is provided which is substantial and durable and which is eminently valuable for use in mining cars.

Having fully described my invention, what I claim as new and desire to secure by Letters-Patent, is:—

1. A car body having metal wall sheets, the outer face of each of said sheets being flat, and each sheet having an integral inwardly projecting vertical stake.

2. A car body having metal wall sheets, the outer face of each of which is flat, each of said sheets bent and forming hollow vertical stakes which project only inwardly from the flat sheets.

3. A car body having flat metal wall sheets bent at intervals forming vertically inwardly projecting hollow stakes extending approximately from the lower to the upper edges of said wall sheets, and floor sheets at the sides of the car body and having upwardly projecting flanges secured to said wall sheets, said flanges bent to conform to the lower portions of the inwardly projecting hollow stakes.

In testimony whereof, I have signed this specification in the presence of two subscribing witnesses.

FRANK M. COWGILL.

Witnesses:
     BLAIR C. HANNA,
     GROVER C. SNYDER.